United States Patent Office 2,856,063
Patented Oct. 14, 1958

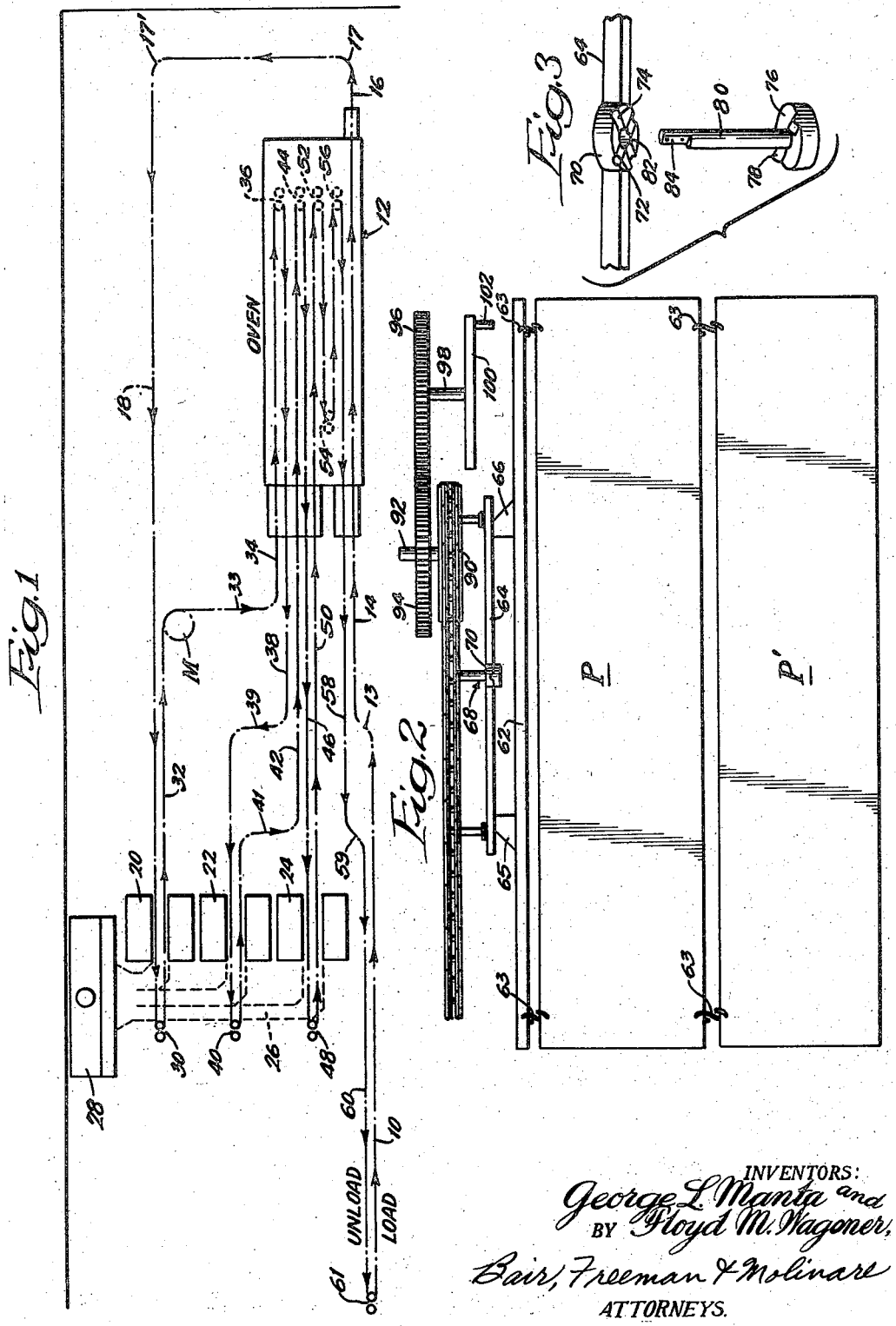

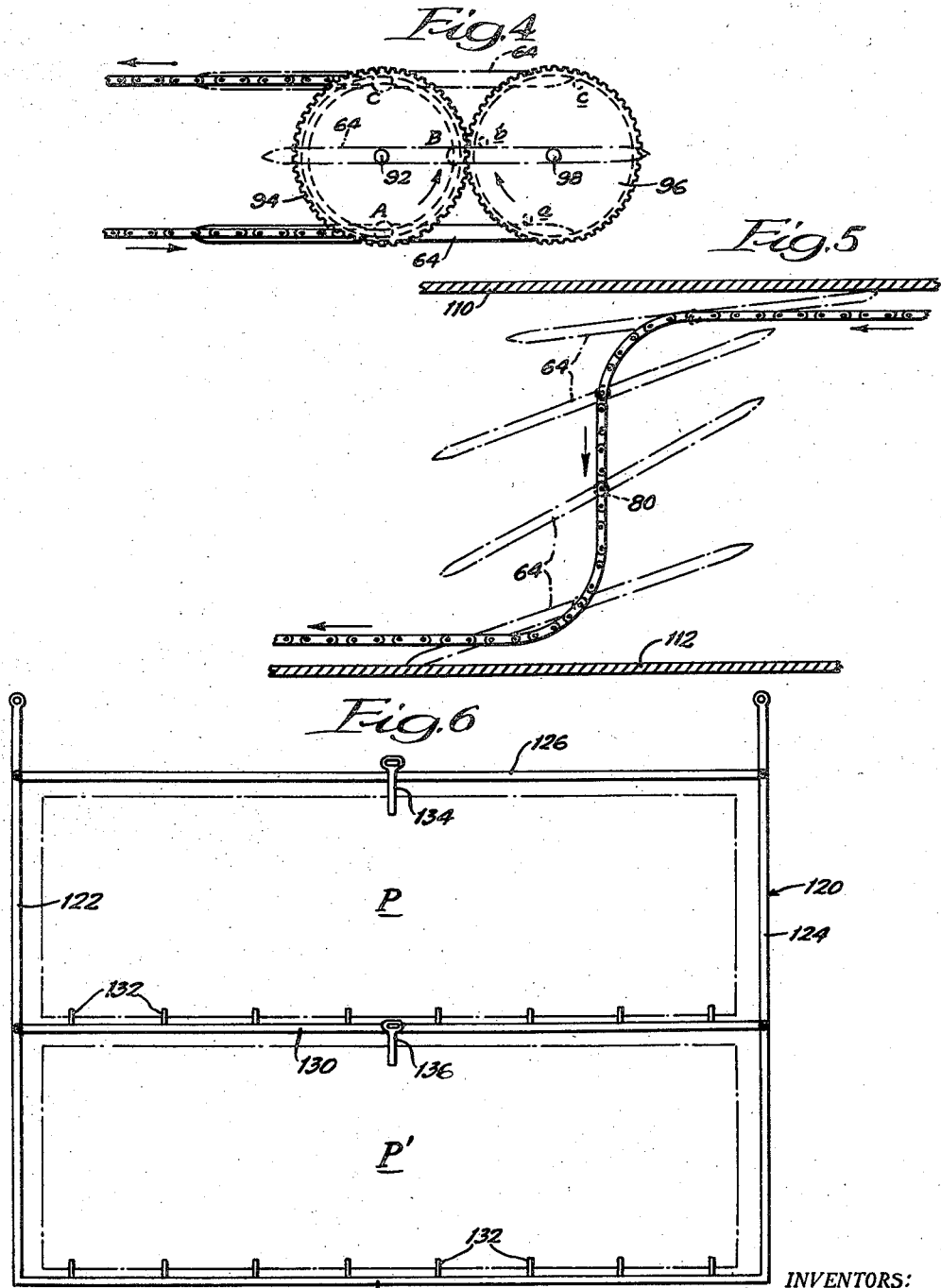

2,856,063

CONVEYOR SYSTEM

Floyd M. Wagoner, Crown Point, Ind., and George L. Manta, Chicago, Ill., assignors to Manta Vin-Cor Steel Corporation, a corporation of Delaware Application October 31, 1955, Serial No. 543,670

7 Claims. (Cl. 198—137)

This invention relates to a conveyor system, and more particularly to a conveyor apparatus adapted to carry articles of substantial length.

For example, a common requirement in industrial painting is the efficient handling of elongated metal sheets which must be painted on both sides with several coats, each requiring oven drying. The only automatic installation presently known for handling the painting of long sheets of this type is adapted to support and carry such sheets in a forward direction along their longitudinal axis while disposed in a substantially horizontal plane. In utilizing such a conveyor apparatus, commonly referred to as a "horizontal" type of system, the uppermost surface of the sheet is sprayed and the sheet is then reversed by hand for spraying of the other side. Such a conveyor system is necessarily excessively long, and installations of this type require over 600 feet of continuous linear floor space for effective multiple coat spraying and oven drying. The sheets, when handled by such prior art systems must be supported on pallets to prevent surface scratching. Since the turning radius required by sheets of such substantial length would also necessitate a plant space of excessive width as well as length, it is common practice to remove the sheet from the conveyor line after coating of its upper surface, rest the sheet upon a stationary supporting surface, remove the supporting pallet from the conveyor, transfer the pallet to a return line adjacent the first line, replace the sheet upon the pallet upon the return line, and then effect spraying of the reverse surface during the return run. Such procedures have required drying ovens of very large size and considerable manual labor, and have been relatively slow and inefficient. Most particularly, such prior art systems have required as many as six separate drying ovens, and have not been adaptable to the use of automatic spray booths. It has formerly been necessary to rely on individual workmen's judgment to adapt the required spray coating for the various different needs of the particular sheet or article being coated, thereby sacrificing not only the efficiency of automatic operation but also the reliability and uniformity essential to the achievement of a quality product.

It is a primary object of the present invention, therefore, to provide a novel conveyor system which departs markedly from the conventional practice of the prior art in handling elongated articles, whereby increased flexibility of material handling, variable speeds of line operation, accurate variation of oven baking temperatures, and the use of automatic spray equipment are achieved.

It is another object of this invention to provide a conveyor system for handling articles of substantial length, wherein minimum turn distances are achieved to permit numerous reversing passes and multiple conveyor runs in a narrow transverse distance, thereby substantially reducing the plant space required for large scale operation.

It is a further object of this invention to provide a conveyor system for multiple-layer coating of substantially elongated articles, wherein continuous and fully automatic operation or "automation" is achieved.

It is still another object of this invention to provide a novel and a fully automatic guide arrangement for effecting 180° changes in direction of conveyor-carried articles of substantial length without any change in longitudinal orientation of the articles.

It is still a further object of this invention to provide automatic and novel guide means for effecting changes in the direction of travel of conveyor-carried articles of substantial length with no appreciable variation in an initially predetermined longitudinal orientation of the article.

It is yet another object of this invention to provide novel indexing suspension means for conveyor-carried articles of substantial length, and particularly multiple suspension in a single vertical plane of large sheets or plates.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a schematic layout view showing a conveyor system for spray painting sheet metal plates, and embodying the features of the present invention;

Figure 2 is a fragmentary side elevational view of a portion of the conveyor system of Figure 1, showing a first embodiment of suspension means for supporting articles of substantial length for maintaining longitudinal orientation thereof at a terminal conveyor point during 180° reversal of the direction of article travel;

Figure 3 is an enlarged perspective view showing details of the indexing suspension means for supporting the articles below the conveyor;

Figure 4 is a top plan view illustrating the guide operation during 180° reversal at the conveyor station shown in Figure 2;

Figure 5 is a top plan view similar to Figure 4 showing the turning and guide operation during a 90° change in travel direction at another conveyor station; and Figure 6 shows an alternative embodiment of suspension means for supporting the elongated articles below the conveyor.

Referring now more particularly to Figure 1 of the drawing, we have illustrated in schematic form a typical conveyor installation embodying and utilizing to good advantage the novel features of the present invention. The conveyor system comprises a continuously moving closed circuit chain conveyor of conventional form adapted to be supported in elevated relation above the floor of a plant or shop. The conveyor includes a loading line or run 10 having a forward direction of travel indicated by the arrows toward a drying oven 12, typically of the radiant blue flame type for industrial paint coating. It will be understood, of course, that an electrical resistance, infrared, or other suitable type of oven may also be employed.

The loading run 10 may be transversely displaced laterally away from the oven to permit location of a loading station at some convenient point not necessarily in direct linear alignment with the oven 12. It will be understood that the run 10 may include passage through preliminary treating equipment, as for example a two-stage washer of conventional type for cleaning prior to the articles' initial passage through the oven for loosening and removing foreign matter and oxides. A pair of angular turns provide lateral displacement or bend 13 between the loading run 10 and an oven inlet run 14 in direct linear alignment with the oven 12. The conveyor chain passes directly through the oven 12 from the inlet run 14 to an emerging oven discharge run 16. A pair of right angle turns 17 and 17' enable the conveyor to effect a substantial transverse travel and return along a cooling line or run 18 substantially parallel to the loading line 10.

A series of spray booths are arranged in transverse alignment for application of a successive number of spray coatings to the opposite sides of the conveyor-carried articles to be painted. Such spray booths are of conventional structure and arrangement well-known in the industrial painting art, and are preferably of the down-draft spray type utilizing a cooperating water wash spray booth for air purification. The various booths are suitably interconnected with each other and with the water wash spray booth to provide a closed system.

The layout shown in Figure 1 illustrates a typical arrangement employing three spray booths, 20, 22 and 24 for effecting a three-layered coating of the articles to be painted. A concrete water tank or pit 26 communicates the bottom of each spray booth with a water wash spray booth 28. In accordance with typical and well-known operation of spray booths, which will not be described herein in detail, the continuous air flow downwardly through the spray booths and outwardly through the water wash spray booth, coupled with continuous water flow for carrying away the downwardly settling excess paint, effects safe and reliable spray operation within an enclosed plant or shop without risk to personnel or damage to surrounding equipment.

The cooling run 18 moves in a return direction, as indicated by the arrows, for passage through the first spray booth 20. During this first run through the booth 20, a first coating is applied to one side of the article. Upon emergence from the spray booth, the direction of travel of the article is reversed by a 180° turning station 30, whereby the article then moves along a reversal path through the same booth 20 for spraying of the opposite side thereof. A first spray discharge line 32 effects travel from the first spray booth 20 toward the oven 12. A suitable drive unit M, such as a 1½ horse power motor, is positioned at this point for convenience of location and servicing. A pair of opposite turns serve to effect transverse travel along a displacement run 33 for direct linear alignment of the conveyor chain with an oven inlet run 34.

The conveyor chain is again directed into the oven 12 along its full length, and effects a reversal at a 180° turning station 36 for reversal along the oven to permit emergence along a discharge run 38 at the same end of the oven at which the inlet run 34 entered. A lateral displacement run 39 effects linear alignment of the conveyor chain for passage through the second spray booth 22. A 180° turning station 40 effects reversal of direction for a return through the same spray booth 22. A further lateral displacement run 41 effects linear alignment of a second post-spray entry run 42 into the oven 12. The conveyor again passes into the oven 12, reverses at a 180° turning station 44 and emerges along a discharge run 46 for passage through the third spray booth 24. Again, reversal at a 180° turning station 48 effects return through the same spray booth 24 for final entry along an inlet run 50 into the oven 12.

A series of 180° turning stations 52, 54 and 56 within the oven 12 indicate the manner in which repeated longitudinal passes may be effected in the oven for greater drying periods, as for example, may be desirable to effect final drying. A final discharge run 58 passes from the oven 12, and by means of a lateral displacement run 59 of angular inclination, similar to run 13, effects linear alignment with a conveniently located unloading line or run 60. A 180° turning station 61 completes the cycle, and joins the unloading run 60 with the loading run 10.

As shown, the loading and unloading runs 10 and 60 are preferably parallel and closely adjacent each other so that the load and unload stations may be positioned at a single operating area for convenient handling of article feeding and removal by a minimum of personnel.

The manner in which the articles are suspended from the chain conveyor, and the manner in which angular displacement runs and 180° reversal turns are effected constitute essential features of our invention. Referring now more particularly to Figures 2 to 4 of the drawing, we will describe the manner of article suspension and the functional operation of our novel guide means for effecting full reversal of the direction of article travel without any change in its longitudinal alignment.

It is essential that the elongated articles to be carried by the conveyor system be suspended from the conveyor chain in longitudinal alignment with the direction of initial chain travel along the loading run 10. For this purpose, we provide a novel work holder and suspension means for effecting hanging of the articles in superposed groups within a single vertical plane longitudinally aligned with the conveyor chain. For purposes of illustration, we have indicated in Figure 2 the manner in which a pair of sheet metal plates P and P' may be handled. A hanger bar 62 of substantially the same length as the plates provides a rigid base member from which the plates P and P' may be hung. For purposes of illustration, we have indicated the use of hooks 63 of the type which may be removably inserted through suitable apertures drilled in the plates adjacent their upper edges. In this way, two or more plates may be suspended from the hanger bar 62 in a vertical tier and substantially in a single plane.

A pivot bar 64 is rigidly secured to the hanger bar 62 by means of suitable connector flanges or the like, 65 and 66. The pivot bar 64 may be of any convenient length capable of providing the structural rigidity and strength necessary to accommodate the particular size and weight of the plates being handled.

The pivot bar 64 is connected to and suspended from the conveyor chain by means of a swivel or indexing hook 68. Such indexing means are well-known, and one typical such device is illustrated herein for purposes of describing the present invention. As best seen in Figure 3, the pivot bar 64 provides a cam disc 70 having suitable lock channels formed therein for defining rest positions and intermediate cam surfaces. Although a pair of lock channels 72 and 74 arranged at right angles for 90° indexing turns have been illustrated, it will be understood that any suitable cam surface arrangement may be provided for whatever angular indexing increments may be desired.

A second cam disc 76, having a lock rib 78 formed thereon for seating cooperation with the lock channels 72, 74 of the first cam disc 70, is carried at the lower end of a rotator shaft 80. The shaft 80 passes through a suitable aperture 82 in the cam disc 70, and provides a connector portion 84 at its upper end for rigid connection to a flight of the conveyor chain. In this way, the pivot bar 64 is suspended from the conveyor in a manner adapted to permit indexing rotation relative to the direction of travel of the conveyor chain when a sufficient torque is exerted against the pivot bar 64 to effect camming action between the discs 70 and 76 of the indexing hook 68.

It is essential to the performance of this invention that the elongated articles carried by the conveyor be reversed in their direction of travel without any swinging or rotational movement requiring an arc of travel sufficient to accommodate the length of the article. For example, in the handling of sheet metal plates, such as those illustrated in Figure 2, rigid suspension from a conveyor would require an operating width greater than the length of the plates for each reversing turn. In the case of typical industrial plates having a length of 12 feet, it is apparent that an operational layout such as that shown in Figure 1 would necessitate a vast expanse of plant area together with either one oven of prohibitively large size or at least five separate ovens. By means of the novel turning arrangement which will now be described in detail, the present invention permits articles of virtually unlimited longitudinal extent to be reversed in their direction of travel within an extremely small lateral distance. For example, the present invention enables plates having a length of 12 feet to be readily and conveniently handled with the same ease as small articles of merely one foot or less in length.

To accomplish directional reversal of the conveyor-carried articles without change in their longitudinal alignment, we provide a 180° turning station which comprises a conveyor chain pinion 90 (see Figures 2 and 4) for complete turning of the conveyor chain, in conventional manner. The chain pinion 90 provides a drive shaft 92 extending thereabove and serving to mount a drive gear 94 for concurrent rotation with the pinion 90 as the conveyor chain is continuously driven. A driven gear 96 is rotatably supported upon a suitably journaled shaft 98, and cooperatingly meshes with the drive gear 94 for rotation therewith. A kicker bar 100 is carried by the driven shaft 98 therebelow. The gears 94 and 96 provide a 1:1 ratio and are substantially of the same size.

The kicker bar 100 carries a roller 102 at its outer end journaled on a vertical axis. The roller 102 is disposed at a radial distance relative to the driven shaft 98 so that the roller 102 is carried through four complete revolutions during a distance of travel of the chain conveyor equal to the length of the hanger bar 62. The indexing hook assemblies of a consecutive series of work holders are carried by the conveyor chain and arranged on predetermined centers so that the rotation of the kicker bar 100 and the roller 102 carried thereby is always maintained in a predetermined timed sequence with each of the successive work holders.

The purpose of the kicker bar 100 and roller 102 is to insure that longitudinal alignment of the work holder and plates suspended therefrom will be maintained during travel and rotation of the shaft 80 about the chain pinion 90. As best seen in Figure 4, the roller 102 moves in the direction indicated by the arrow on gear 96 so as to be immediately in advance of the pivot bar 64 as the rotator shaft 80 of the indexing hook 68 approaches the chain pinion 90. As the shaft 80 begins its arc of travel around the pinion 90, the pivot bar 62 and the plates suspended therefrom also tend to effect simultaneous rotation therewith as a single unitary assembly. Such rotation of the pivot bar 64 is obstructed and prevented by the roller 102 of the kicker bar 100. In this way, the discs 70 and 78 effect a camming action so as to permit the rotator shaft 80 to turn a full 180° relative to the pivot bar 64.

In Figure 4 of the drawing, we have indicated three advancing positions of the rotator shaft 80 at points A, B, C on the drive gear 94. Three cooperating positions of the roller 102 are likewise indicated at points a, b, c on the driven gear 96. It will be apparent from the solid and dotted line advance positions of the pivot bar 64 that the roller 102 maintains engagement thereagainst so as to prevent any rotation with the shaft 80, and thereby effect camming operation of the indexing hook assembly 68. In this way, a 180° change in the direction of travel of the plates P and P' is readily effected within the small lateral distance of the width of the chain pinion 90, while maintaining at all times the same longitudinal alignment of the plates and the work holder.

We have found the use of a vertical axis roller to be an efficient means for effecting holding engagement against the pivot bar 64 during concurrent arcuate and opposed movements of the kicker bar 100 and the pivot bar 64. As an alternative construction, it may be desirable to utilize a kicker bar which is split so as to form a yoke portion adapted to engage the pivot bar 64 on opposite sides thereof, thereby further assisting the maintenance of longitudinal alignment of the work holder by insuring centering thereof during travel of the indexing hook about the chain pinion.

The lateral displacement travel of the conveyor by means of a pair of complementary opposite angular turns, such as the runs indicated at 13, 33, 39, 41, and 59 in Figure 1 of the drawing, necessitate the use of a different form of guide means for maintaining longitudinal alignment of the work holder and suspended articles because of the substantial transverse distances which may be involved. In Figure 5 of the drawing, we have illustrated an effective and simple guide means for permitting the chain conveyor to traverse a path involving two 90° turns and a substantial lateral run therebetween. In essence, the means provided comprises essentially a pair of guide rails 110 and 112 positioned so as to oppose rotation of the work holder beyond some minor angle up to about 45° as it moves transversely therebetween. The guide rails are disposed outwardly of the conveyor chain at each of the two turning points of the transverse run. As the work holder begins to traverse a first right angle turn, from top to bottom in Figure 5, the rotator shaft 80 of the indexing hook effects a turning which tends to rotate the pivot bar 64 suspended therefrom in a counter-clockwise direction as seen in Figure 5. Closely adjacent the upper 90° turning portion of the conveyor, the guide rail 110 effects contacting engagement with the transversely outwardly swinging portion of the pivot bar 64, thus opposing and limiting the rotation thereof. As the work holder continues to move forwardly with the contacting end of the pivot bar 64 sliding along the guide rail 110, a camming action will take place between the discs 70 and 76 of the indexing hook 68.

Although some angular inclination of the pivot bar 64 will be permitted, complete 90° turning is prevented. As the leading end of the pivot bar 64 approaches the second and oppositely directed 90° turn of the chain conveyor, it engages the second guide rail 112 positioned in like manner as the guide rail 110. As the rotator shaft 80 effects clockwise turning, camming action of the indexing hook 68 by cooperating opposition between the guide rail 112 and the pivot bar 64 serves to return the work holder to its initial position of longitudinal alignment.

It will be apparent that the extent of angular rotation of the work holder may be effectively predetermined by appropriate selection of the angular displacement between the locking surfaces of the cam discs of the indexing hook. The positioning of the guide rails 110 and 112 may be predetermined by the length of the article being handled so that the allowed angle of rotation will be less than the camming distance between the longitudinally aligned position of indexing hook "locking" and the next locking position of angular rotation. For example, if 45° camming increments are selected, the rails 110 and 112 must be of sufficient length relative to the length of the article so that the maximum angle formed by the rotator shaft 80, at its center position along the 90° turn of the conveyor chain, and the transversely outward end of the pivot bar 64 in contacting engagement with the guide rail, does not permit an angle greater than 45° relative to the entry direction of travel of the conveyor chain preceding the turn. It is apparent that the necessary distances and lengths may be readily computed for any given article dimension in accordance with the principles herein disclosed.

As a further alternative construction, it will be apparent that a guide arrangement similar to that shown in Figure 5 of the drawing may also be employed at a 180° turn station as an alternative to the gear driven kicker bar illustrated in Figures 2 and 4. In such a construction, the guide rails will permit some angular displacement of the work holder during turning, but such rotation may be effectively limited to a minor angle within the lateral bounds defined by the transverse distance between the opposed pair of guide rails.

In Figure 6 of the drawing we have shown still a further embodiment of this invention wherein an alternate suspension means for hanging elongated metal sheets is provided. In some coating operations, it is not possible to provide drill holes for accommodating suspension hooks such as those indicated at 63 in Figure 2. The handling of galvanized sheets is an example of such a situation. We propose, therefore, to utilize a frame 120, which may be readily fabricated from suitable tubing or rod stock. The frame may be arranged to accommodate any number of plates or articles in superposed vertical planar alignment. An arrangement for supporting two plates will be described for purposes of illustration.

The frame 120 includes a pair of sides 122 and 124 interconnected by a top rod 126, a bottom rod 128, and an intermediate rod 130. The intermediate and bottom rods 130 and 128 provide a plurality of rigidly carried plate holders 132 of generally V-shape upon which the bottom edges of the plates P and P′ are adapted to be received in resting engagement. A pair of spring tension tongs 134 and 136 are provided by the top and intermediate rods 126 and 130, respectively, substantially intermediate the sides 120 and 122. The tongs provide manually releasable gripping means for securing the plates within the frame.

It will be understood that the top and intermediate rods 126 and 130 may be adjustably secured to the sides 120 and 122 so as to permit vertical adjustment for accommodating plate widths of varying height. The top ends of the sides 120 and 122 are adapted to be suitably secured to a suspension bar comparable to the pivot bar 64 of the arrangement of Figure 2, so that the entire frame 120 may be maintained in longitudinal alignment or allowed to index as desired in the manner heretofore described.

Changes may be made in the construction and arrangement of the parts of our invention without departing from the real spirit and purpose of our invention, and it is our intention to cover by the claims any modified forms of structure or use of mechanical improvements which may be reasonably included within their scope.

What we claim as new and desire to obtain by Letters Patent of the United States is:

1. In a conveyor system for transporting articles of substantial length, a conveyor having means for effecting driving movement thereof through a path of travel including changes in direction, a hanger member having a length substantially equal to that of an article to be transported and providing a rigid base for removably supporting such article, a pivot member relatively fixedly secured to the hanger member, indexing means relatively fixedly carried by said conveyor and rotatably secured to said pivot member, and guide means operative to engage said pivot member and restrain it against movement away from an initial position of longitudinal alignment, whereby normal movement of said pivot member away from said initial position as said indexing means is carried through a change in conveyor direction is prevented by effecting rotation of said pivot member relative to said indexing means.

2. In a conveyor system for transporting articles of substantial length, a conveyor having means for effecting driving movement thereof through a path of travel including changes in direction, a hanger member having a length substantially equal to that of an article to be transported and providing a rigid base for removably supporting such article, a pivot member relatively fixedly secured to the hanger member, an indexing hook relatively fixedly carried by said conveyor and rotatably secured to said pivot member by cam means to permit indexing rotation of the pivot member relative to the direction of conveyor travel, and guide means operative to engage said pivot member and restrain it against movement away from an initial position of longitudinal alignment, whereby normal movement of said pivot member away from said initial position as said indexing hook is carried through a change in conveyor direction is prevented by effecting camming rotation of said pivot member relative to said indexing hook.

3. In a conveyor system for transporting articles of substantial length, a conveyor having means for effecting driving movement thereof through a path of travel including a reverse change in direction between a forward and a return run, a hanger member having a length substantially equal to that of an article to be transported and providing a rigid base for removably supporting such article, a pivot member relatively fixedly secured to the hanger member, connector means relatively fixedly carried by said conveyor and secured to said pivot member in normally relatively fixed relation, said connector means being rotatable relative to said pivot member, and guide means operatively driven by said conveyor in timed relation therewith to engage said pivot member and restrain it against movement away from an initial position of longitudinal alignment, whereby normal movement of said pivot member away from said initial position as said connector means is carried through a change in conveyor direction is prevented by effecting rotation of said pivot member relative to said connector means.

4. In a conveyor system for transporting articles of substantial length, a conveyor having means for effecting driving movement thereof through a path of travel including a pair of consecutive complementary angular turns, a hanger member having a length substantially equal to that of an article to be transported and providing a rigid base for removably supporting such article, a pivot member relatively fixedly secured to the hanger member, connector means relatively fixedly carried by said conveyor and secured to said pivot member in normally relatively fixed relation, said connector means being rotatable relative to said pivot member, and separate guide means disposed at each of said turns and cooperating successively with said pivot member, the first turn guide means permitting minor angular rotation of the pivot member relative to the connector means and the second turn guide means effecting opposite return rotation, whereby normal movements of said pivot member away from said initial position as said connector means is carried through each of said changes in conveyor direction is prevented by successively effecting rotations of said pivot member relative to said connector means.

5. In a conveyor system for transporting articles of substantial length, a conveyor having means for effecting driving movement thereof through a path of travel including a substantial change in direction defining a turn station, a hanger member having a length substantially equal to that of an article to be transported and providing a rigid base for removably supporting such article, a pivot member relatively fixedly secured to the hanger member, connector means relatively fixedly carried by said conveyor and secured to said pivot member in normally relatively fixed relation, said connector means being rotatable relative to said pivot member, and a kicker bar mounted in advance of said turn station and rotatably driven in timed relation with said conveyor, the direction of rotation of said kicker bar serving to move said kicker bar immediately in advance of said pivot member along the path of movement through the turn station, said kicker bar engaging said pivot member and restraining it against movement away from an initial position of longitudinal alignment, whereby normal movement of said pivot member away from said initial position as said connector means is carried through said turn station is prevented by effecting rotation of said pivot member relative to said connector means.

6. In a conveyor system for transporting articles of substantial length, a conveyor having means for effecting driving movement thereof through a path of travel including a substantial change in direction defining a turn station, a hanger member having a length substantially equal to that of an article to be transported and providing a rigid base for removably supporting such article, a pivot member relatively fixedly secured to the hanger member, connector means relatively fixedly carried by said conveyor and secured to said pivot member in normally relatively fixed relation, said connector means being rotatable relative to said pivot member, and a kicker bar mounted in advance of said turn station and rotatably driven in timed relation with said conveyor, the direction of rotation of said kicker bar serving to move said kicker bar immediately in advance of said pivot member along the path of movement through the turn station, said kicker bar engaging said pivot member and restraining it against movement away from an initial position of longitudinal alignment, whereby normal movement of said pivot member away from said initial position as said connector means is carried through said turn station is prevented by effecting rotation of said pivot member relative to said connector means, and whereby the trailing end of an article suspended from said pivot member is kicked laterally across said turn station and out of the path of travel preceding said turn station as the leading end of the article is restrained by said kicker bar, so as to provide immediate clearance of the trailing end of a turning article with the leading end of a following article.

7. In a conveyor system for transporting articles of substantial length, a conveyor having means for effecting driving movement thereof through a path of travel including a substantial change in direction between a forward and a turn run defining a turn station, a hanger member having a length substantially equal to that of an article to be transported and providing a rigid base for removably supporting such article, a pivot member relatively fixedly secured to the hanger member, connector means relatively fixedly carried by said conveyor and secured to said pivot member in normally relatively fixed relation, said connector means being rotatable relative to said pivot member, and kicker means mounted in advance of said turn station and rotatably driven in timed relation with said conveyor to engage said pivot member immediately in advance thereof and restrain it against movement away from an initial position of longitudinal alignment, whereby normal movement of said pivot member away from said initial position as said connector means is carried through said turn station is prevented by effecting rotation of said pivot member relative to said connector means, and whereby the trailing end of an article suspended from said pivot member is kicked laterally across said turn station and out of the path of travel preceding said turn station as the leading end of the article is restrained by said kicker bar, so as to provide immediate clearance of the trailing end of a turning article with the leading end of a following article, the position of said kicker relative to said article initial position of longitudinal alignment at the point of engagement with said pivot member serving to predetermine the timing of clearance and lateral kick-over.

References Cited in the file of this patent

UNITED STATES PATENTS

| | | |
|---|---|---|
| 2,279,686 | Kerlin | Apr. 14, 1942 |
| 2,672,230 | Jetzke | Mar. 16, 1954 |